(12) United States Patent
Hsu et al.

(10) Patent No.: US 9,523,906 B2
(45) Date of Patent: Dec. 20, 2016

(54) PROJECTION DEVICE CAPABLE OF CHANGING DIRECTION OF LIGHT PROJECTION

(71) Applicants: Sintai Optical (Shenzhen) Co., Ltd., Shenzhen, Guandong Province (CN); Asia Optical International Ltd., Tortola (GB)

(72) Inventors: Chiao-Sen Hsu, Taichung (TW); Chen-Ren Yu, Taichung (TW)

(73) Assignees: SINTAI OPTICAL (SHENZHEN) CO., LTD., Shenzhen, Guangdong Province (CN); ASIA OPTICAL INTERNATIONAL LTD., Tortola (VG)

(*) Notice: Subject to any disclaimer, the term of this patent is extended or adjusted under 35 U.S.C. 154(b) by 32 days.

(21) Appl. No.: 14/617,987

(22) Filed: Feb. 10, 2015

(65) Prior Publication Data
US 2015/0234261 A1    Aug. 20, 2015

(30) Foreign Application Priority Data
Feb. 17, 2014  (TW) ............................ 103105053 A

(51) Int. Cl.
G03B 21/14 (2006.01)
G03B 21/28 (2006.01)
G03B 21/30 (2006.01)

(52) U.S. Cl.
CPC ............ G03B 21/142 (2013.01); G03B 21/28 (2013.01); G03B 21/30 (2013.01)

(58) Field of Classification Search
CPC ................................ G03B 21/14; G03B 21/28
See application file for complete search history.

(56) References Cited

U.S. PATENT DOCUMENTS

| | | | |
|---|---|---|---|
| 5,396,301 A * | 3/1995 | Sasaki | H04N 5/7441 348/794 |
| 2013/0286361 A1* | 10/2013 | Vasquez | G03B 21/28 353/70 |

* cited by examiner

Primary Examiner — Sultan Chowdhury
Assistant Examiner — Danell L Owens
(74) Attorney, Agent, or Firm — McClure, Qualey & Rodack, LLP

(57) ABSTRACT

A projection device of the invention includes a housing, a light engine disposed in the housing, a lens disposed on a lateral side of the housing, and a light direction regulating mechanism disposed on the lateral side and in front of the lens. The light direction regulating mechanism is able to determine propagation of the light in a selected direction after the light passes through the lens.

19 Claims, 10 Drawing Sheets

PROJECTION DEVICE CAPABLE OF CHANGING DIRECTION OF LIGHT PROJECTION

BACKGROUND OF THE INVENTION

Field of the Invention

The invention relates to a projection device, and more particularly to a projection device capable of changing the direction of light projection.

Description of the Related Art

Referring to FIGS. 1 and 2, a conventional projection device 10 includes a first housing 12 and a second housing 14. The first housing 12 is pivoted to the second housing 14 by a hinge 13. A light engine (not shown) and a lens 15 are disposed in the first housing 12. A circuit board and a power supply (not shown) are disposed in the second housing 14. In operation, the direction of light projection can be changed only by rotating the first housing 12. In the described structure, however, the light engine is disposed in the first housing 12 and the power supply and the circuit board are disposed in the second housing 14. Therefore, a flexible printed circuit board extending between the first housing 12 and the second housing 14 is necessary. Such structure is complicated.

BRIEF SUMMARY OF THE INVENTION

To address the shortcomings discussed, the invention provides a projection device with simple structure and high reliability, in which a mirror is used for changing the direction of light projection. The projection device in accordance with an exemplary embodiment of the invention includes a housing, a light engine disposed in the housing to emit light, a lens disposed on a lateral side of the housing, for the light to pass therethrough, and a light direction regulating mechanism disposed on the lateral side and in front of the lens, to determine propagation of the light in a selected direction after the light passes through the lens.

In another exemplary embodiment, the light direction regulating mechanism includes a movable mirror, and the light passing through the lens is reflected by the mirror when the mirror is moved to be in front of the lens.

In yet another exemplary embodiment, an angle is formed between a normal line of the mirror and the selected direction.

In another exemplary embodiment, the angle is substantially 45°.

In yet another exemplary embodiment, the light direction regulating mechanism further comprises a cover body comprising a first opening, and the mirror is disposed in the cover body.

In another exemplary embodiment, the cover body comprises a partition wall dividing the interior space of the cover body into a first space and a second space.

In yet another exemplary embodiment, the first opening corresponds to the first space, and the mirror is disposed in the second space.

In another exemplary embodiment, the cover body further comprises a front wall on which the first opening is formed.

In yet another exemplary embodiment, the cover body is disposed on the lateral side and slidable between a first position and a second position, the light passing through the lens exits from the first opening when the cover body is in the first position, and the mirror is disposed in front of the lens to reflect the light passing through the lens when the cover body is in the second position.

In another exemplary embodiment, the light direction regulating mechanism further comprises a front cover disposed on the cover body to selectively cover or expose the first opening, and the light passing through the lens exits from the first opening when the first opening is exposed.

In yet another exemplary embodiment, the cover body is disposed on the lateral side of the housing and rotatable between a third position and a fourth position, the light passing through the lens exits from the first opening when the cover body is rotated to the third position, and the mirror is disposed in front of the lens to reflect the light passing through the lens when the cover body is rotated to the fourth position.

In another exemplary embodiment, the cover body is rotatably disposed on the housing through a shaft.

In yet another exemplary embodiment, the light direction regulating mechanism further comprises a front cover disposed on the cover body to selectively cover or expose the first opening, and the light passing through the lens exits from the first opening when the first opening is exposed.

In another exemplary embodiment, the light direction regulating mechanism further comprises a front cover disposed on the cover body to selectively cover or expose the first opening, and the light passing through the lens exits from the first opening when the first opening is exposed.

In yet another exemplary embodiment, the mirror is slidably disposed in the cover body, and the light passing through the lens is reflected by the mirror when the mirror slides to be in front of the lens.

In another exemplary embodiment, the cover body further comprises a front wall on which the first opening is formed, a lateral wall and a second opening formed on the lateral wall, when the mirror slides to be in front of the lens, the light reflected by the mirror passes through the second opening.

In yet another exemplary embodiment, the lateral wall is adjacent to the front wall.

In another exemplary embodiment, the cover body further comprises a first front cover configured to cover the first opening and a second front cover configured to cover the second opening.

In yet another exemplary embodiment, the light direction regulating mechanism further comprises a cover body detachably mounted on the lateral side of the housing and in front of the lens, the mirror is disposed in the cover body, and the mirror is disposed in front of the lens to reflect the light passing through the lens when the cover body is mounted on the lateral side of the housing.

In another exemplary embodiment, the cover body is a hollow cuboid.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
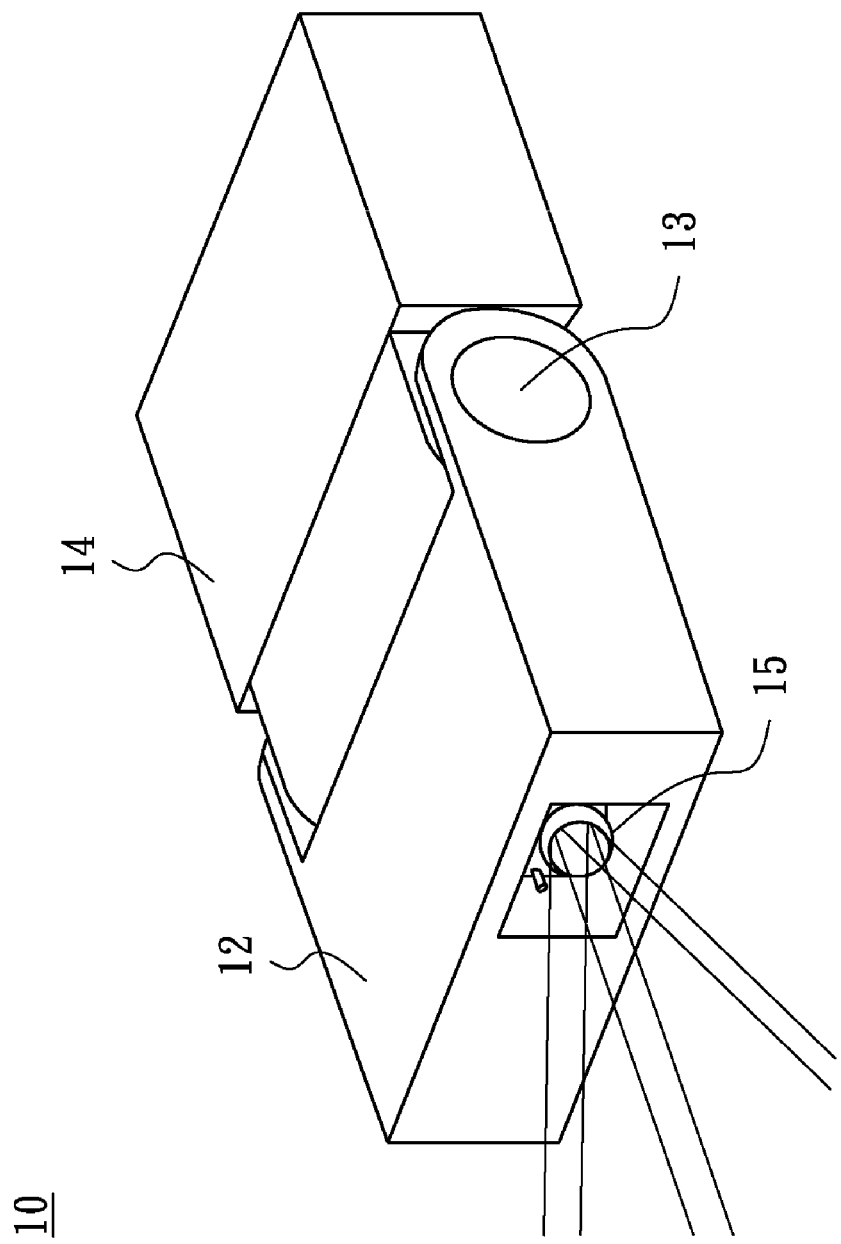
FIGS. 1 and 2 depict a conventional projection device.
Figure 2:
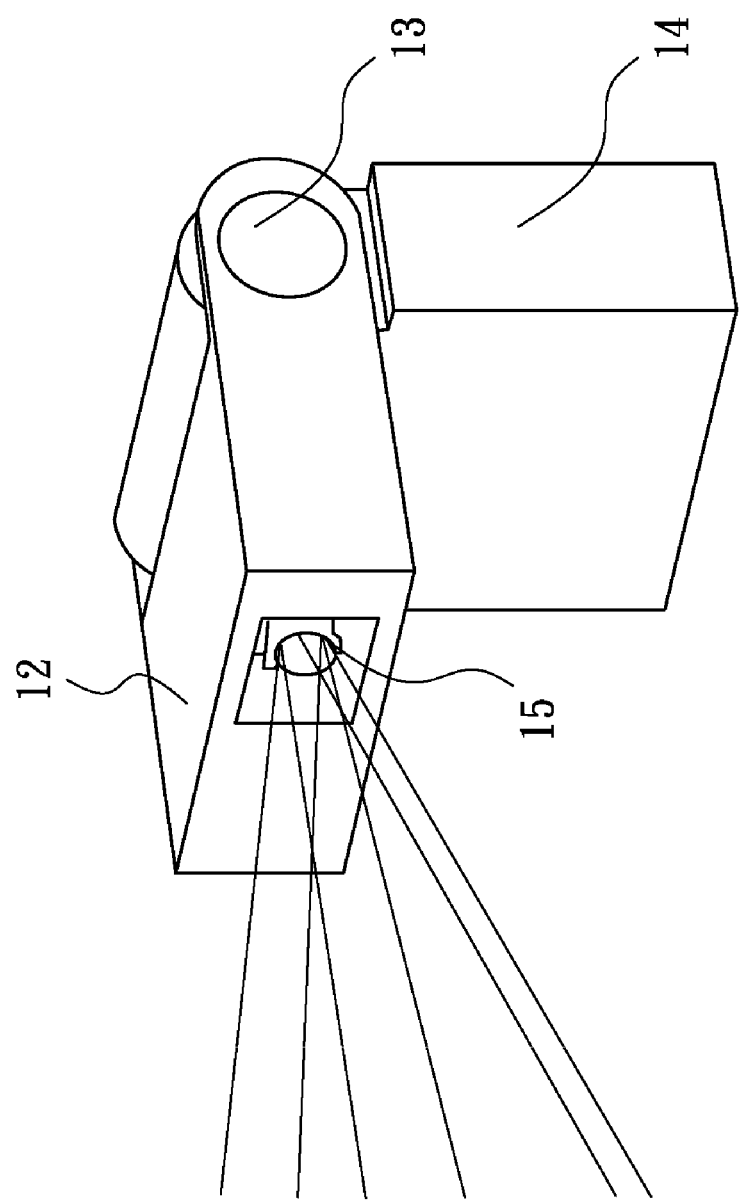
Figure 3:
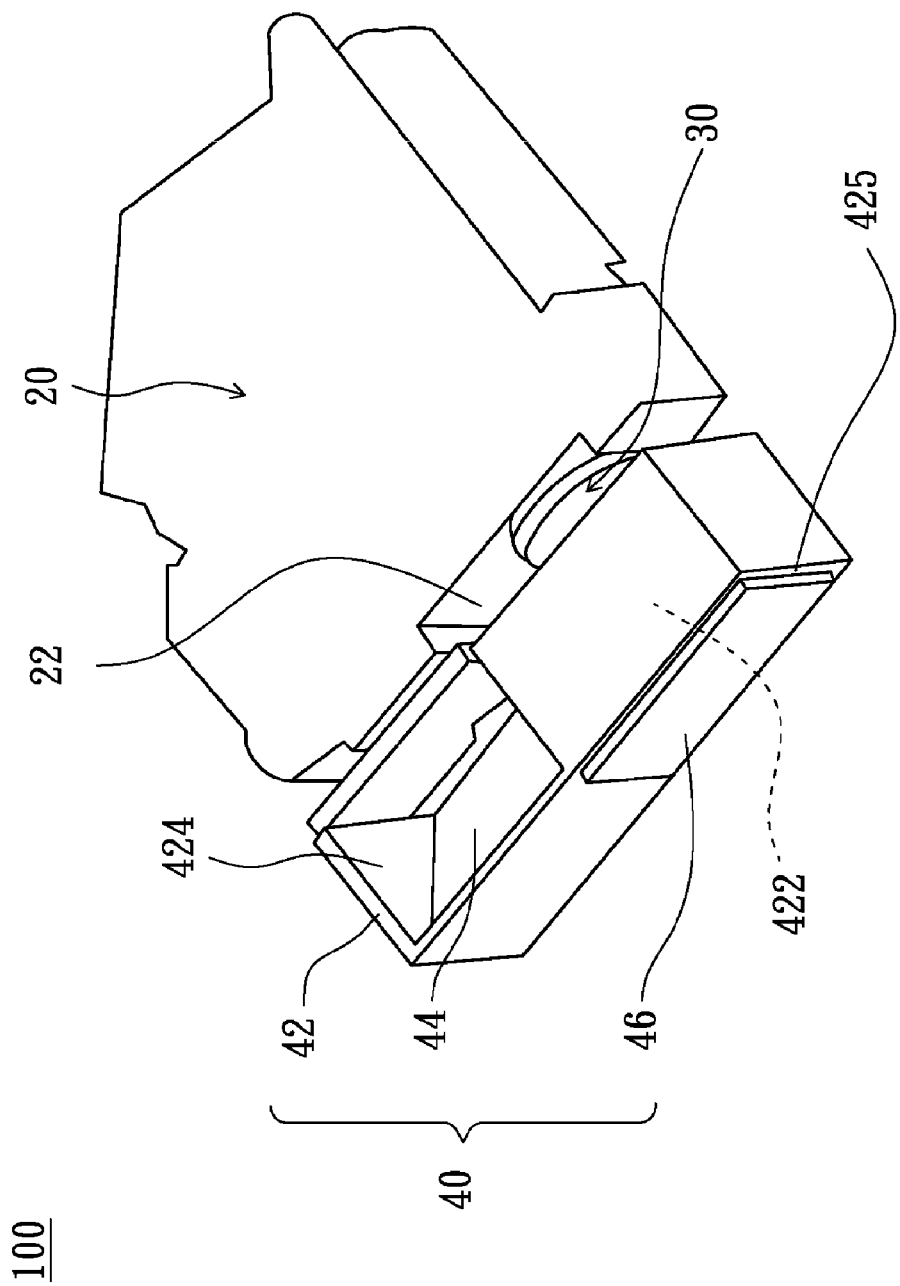
FIG. 3 is a perspective view of an embodiment of a projection device of the invention.
Figure 4:
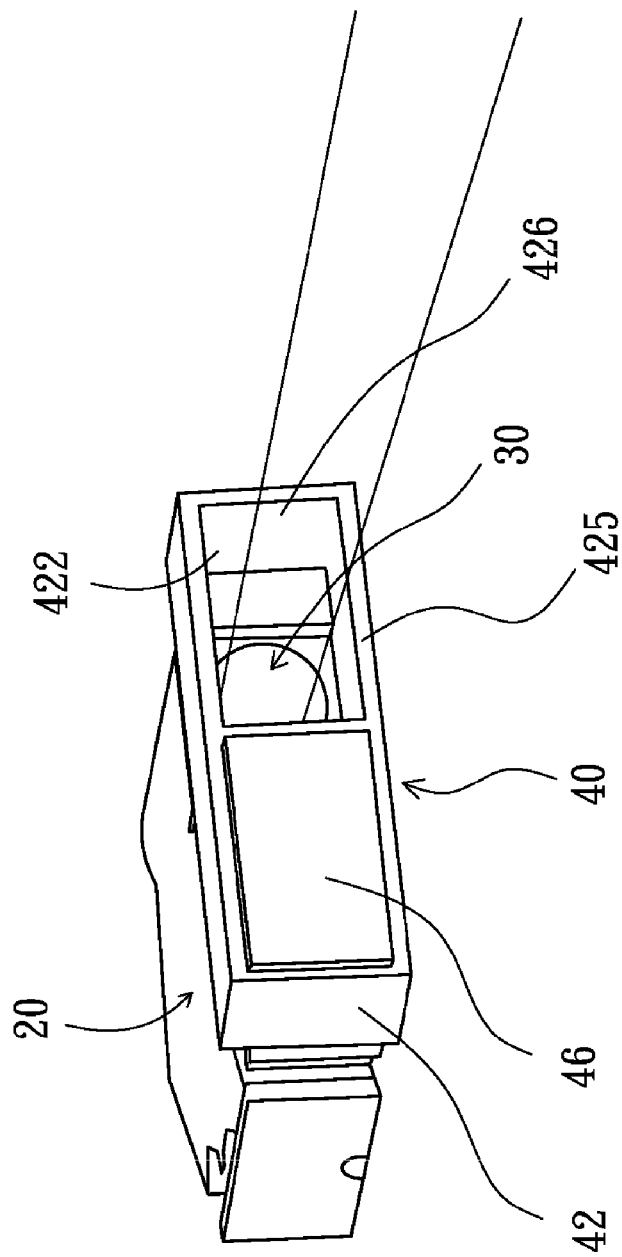
FIGS. 4 and 5 depict the projection device of FIG. 3 in use.

Referring to FIGS. 3 and 4, a projection device 100 includes a housing 20. A light engine (not shown) is disposed in the housing 20. A lens 30 disposed on a lateral side 22 of the housing 20 is connected to the light engine. A light direction regulating mechanism 40 is disposed on a lateral side 22 of a housing 20. The light direction regulating mechanism 40 includes a cover body 42, a mirror 44 and a front cover 46. The cover body 42 is a hollow cuboid and slidably disposed on the lateral side 22 of the housing 20 to hide the lens 30. The cover body 42 has a partition wall 421(shown in FIG. 5) which divides the interior space of the cover body 42 into a first space 422 and a second space 424. The cover body 42 further has a front wall 425. An opening 426 corresponding to the first space 422 is formed on the front wall 425. The front cover 46 is slidably disposed on the front wall 425 and capable of covering the opening 426. The mirror 44 is disposed on the second space 424 and has a normal line intersecting an optical axis of the lens 30 to substantially form an angle of 45°.

Figure 5:
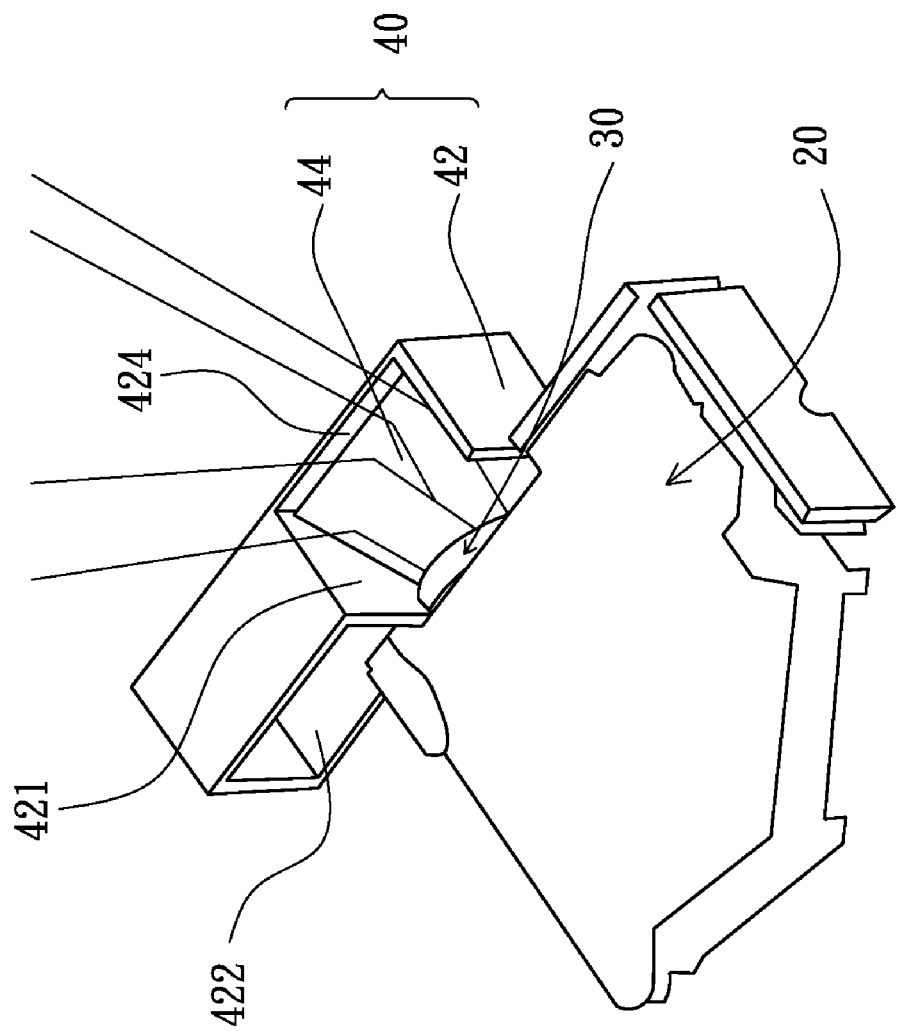

Referring to FIGS. 4 and 5, the cover body 42 is disposed on the lateral side 22 of the housing 20 slidable between a first position and a second position. When the cover body 42 slides to the first position, as shown in FIG. 4, the lens 30 is directed to the first space 422. Thus, light can pass through the lens 30 and the opening 426 to be projected to an object, such as a screen, if the front cover 46 slides to expose the opening 426. When the cover body 42 slides to the second position, as shown in FIG. 5, the lens 30 is directed to the second space 424. Light passing through the lens 30 is reflected by the mirror 44 to travel substantially at an angle of 90° with respect to the optical axis of the lens 30. Thus, light direction of FIG. 5 is changed at about 90° as compared with the light direction of FIG. 4. In practical applications, the originally forward-projected light is projected to a ceiling or a desk.

Figure 6A:
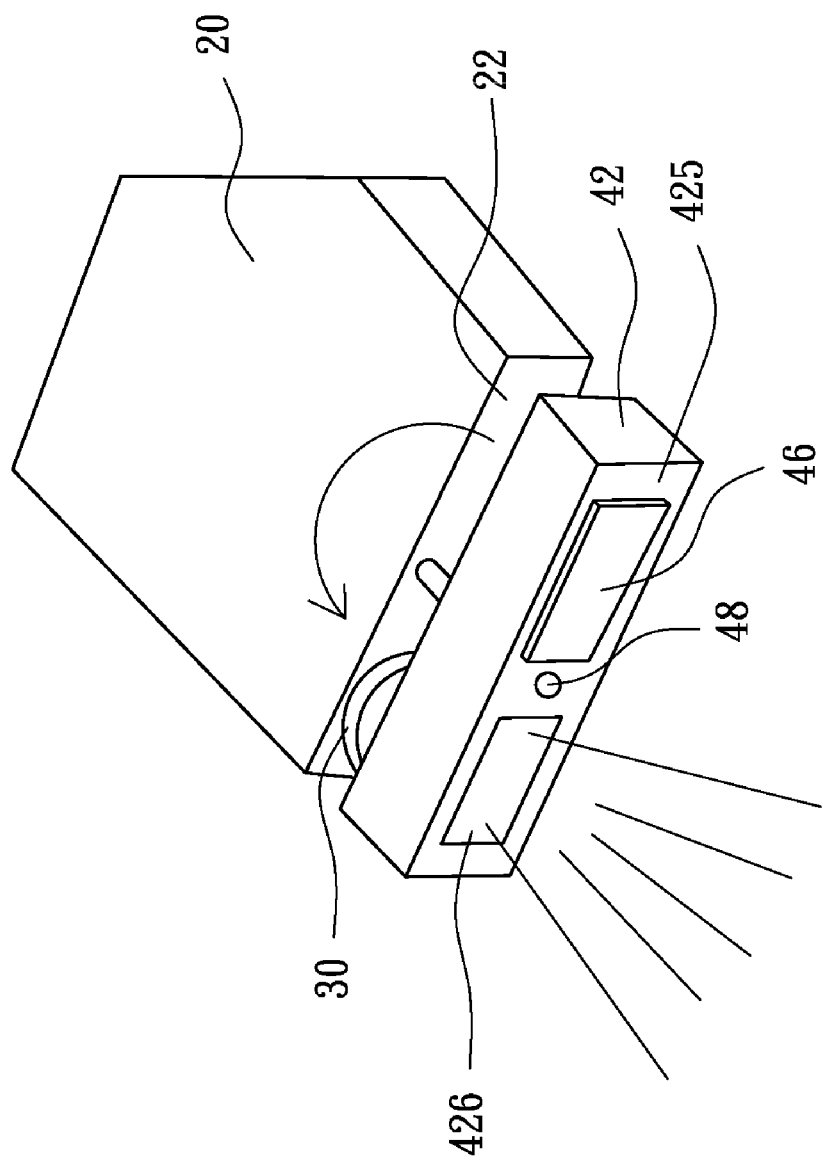
FIGS. 6A and 6B are perspective views of another embodiment of a projection device of the invention.
Figure 6B:
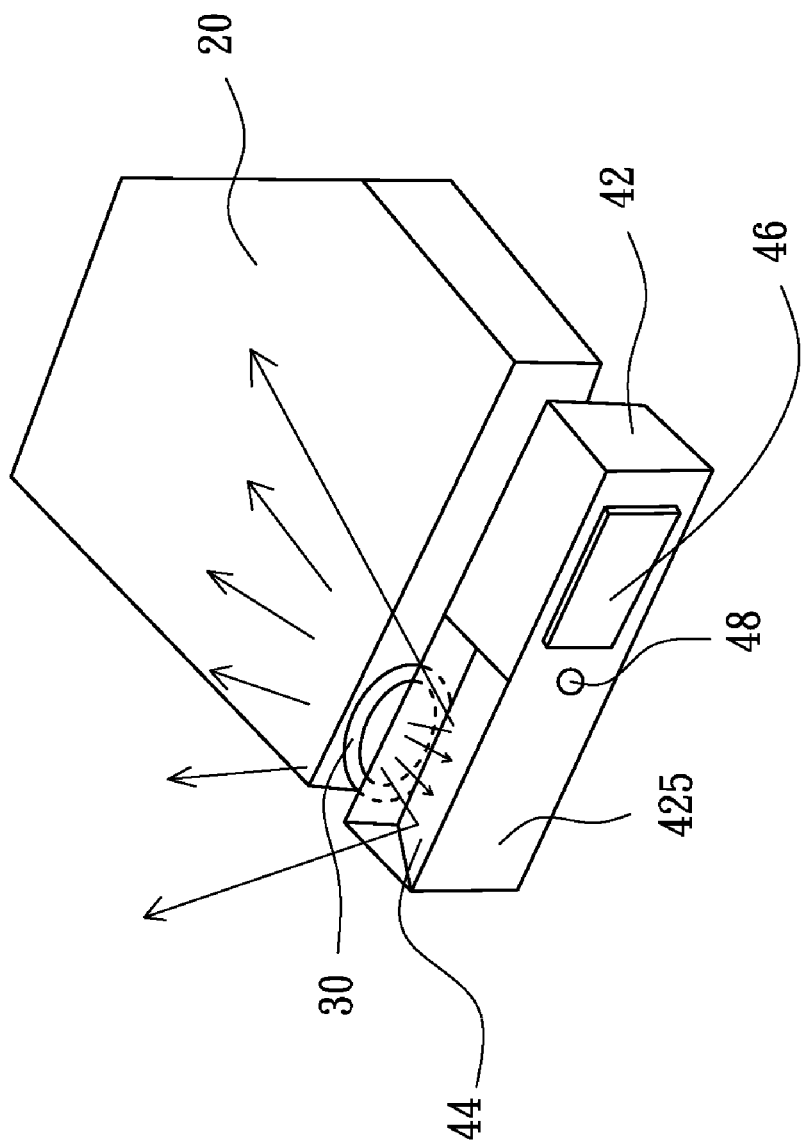

FIGS. 6A and 6B depict another embodiment of a projection device of the invention. In this embodiment, the cover body 42 has the same structure as the embodiment shown in FIGS. 3-5. The cover body 42 is disposed on a lateral side 22 of the housing 20 and rotatable between a third position and a fourth position with respect to a hinge 48. When the cover body 42 is rotated to the third position, as shown in FIG. 6A, the lens 30 is directed to the first space 422. Thus, light can pass through the lens 30 and the opening 426 to be projected on an object, such as a screen, if the front cover 46 slides away to expose the opening 426. When the cover body 42 is rotated to the fourth position, as shown in FIG. 6B, the lens 30 is directed to the second space 424. Light passing through the lens 30 is reflected by the mirror 44 to travel substantially at an angle of 90° with respect to the optical axis of the lens 30. Therefore, light direction of FIG. 6B is changed at about 90° as compared with the light direction of FIG. 6A.

Figure 7A:
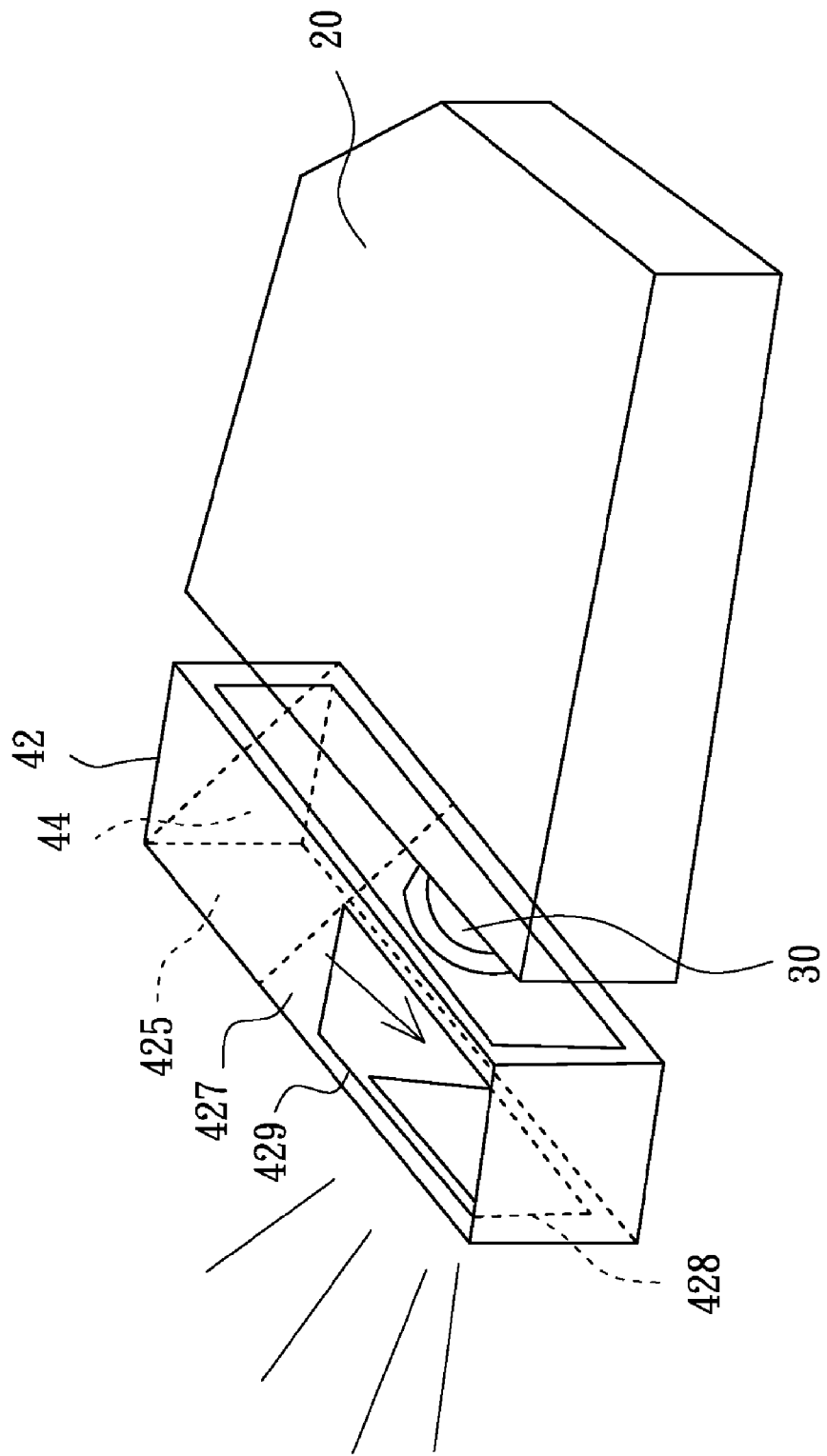
FIGS. 7A and 7B are perspective views of another embodiment of a projection device of the invention.
Figure 7B:
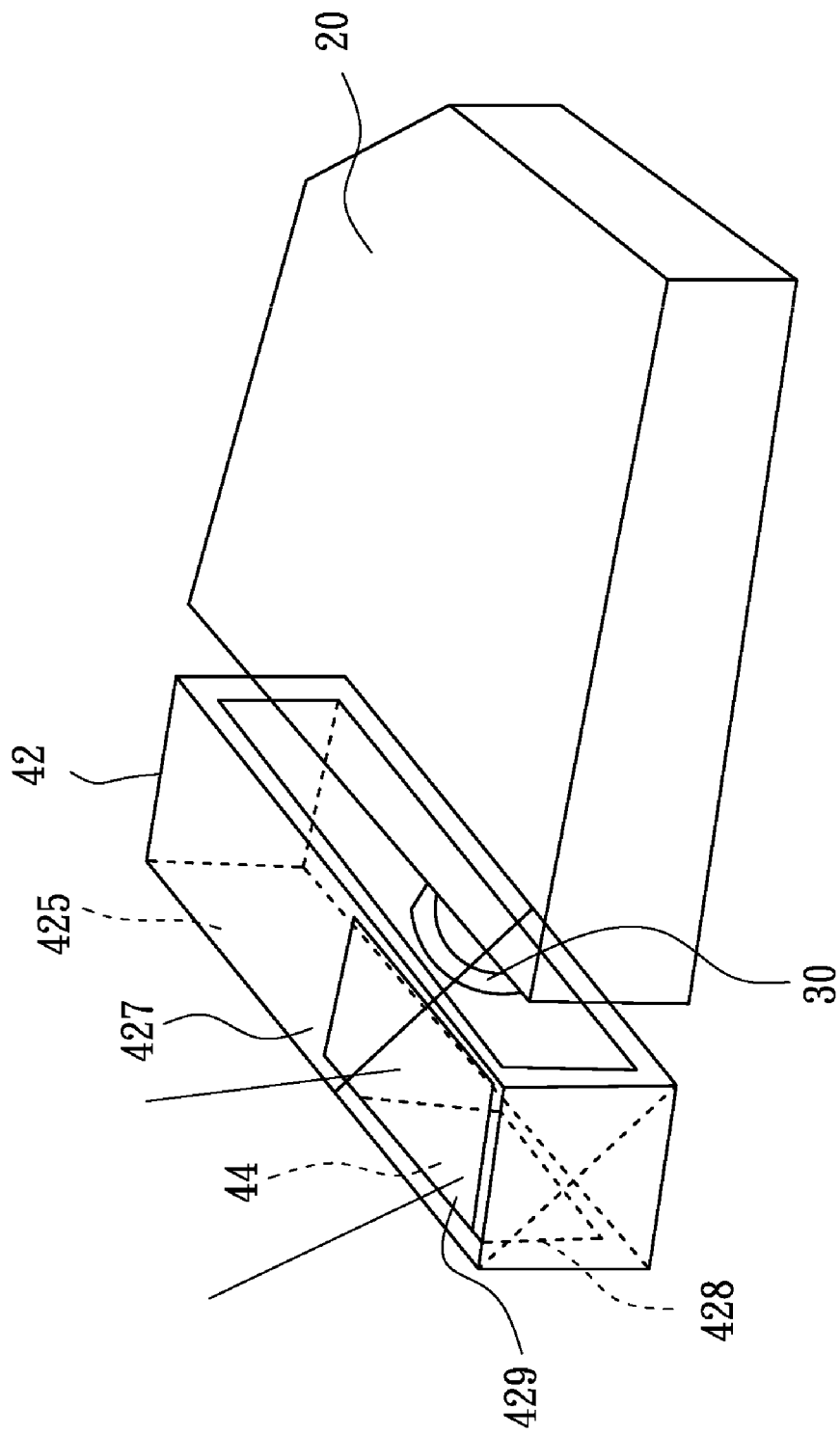

FIGS. 7A and 7B depict another embodiment of a projection device of the invention. In this embodiment, the cover body 42 has a structure different from previous embodiments. The cover body 42 is a hollow cuboid and fixed to the lateral side 22 of the housing 20. A first opening 428 and a second opening 429 corresponding to the lens 30 are respectively formed on the front wall 425 and a lateral wall 427 of the cover body 42. The mirror 44 is disposed in the cover body 42, and has a normal line intersecting an optical axis of the lens 30 to form an angle of 45°. The mirror 44 is disposed in the cover body 42 and movable between a fifth position and a sixth position. When the mirror 44 is in the fifth position, as shown in FIG. 7A, the lens 30 is directed to the first opening 428, and light passes through the lens 30 and the first opening 428 to be projected on an object, such as a screen. When the mirror 44 moves to the sixth position (in front of the lens 30), as shown in FIG. 7B, light passes through the lens 30 and is reflected by the mirror 44 to travel in an angle of 90° with respect to the optical axis of the lens 30 to passes through the second opening 429. Therefore, light direction of FIG. 7B is changed at 90° as compared with the light direction of FIG. 7A. To avoid light leakage, a first front cover and a second front cover are disposed in front of the first opening and the second opening. For the sake of clarity, the first front cover and the second front cover are omitted in FIGS. 7A and 7B. The mechanism for moving the mirror 44 may be a push rod connected to the mirror 44, which is manually operated. However, the mechanism for moving the mirror 44 is not limited thereto.

Figure 8:
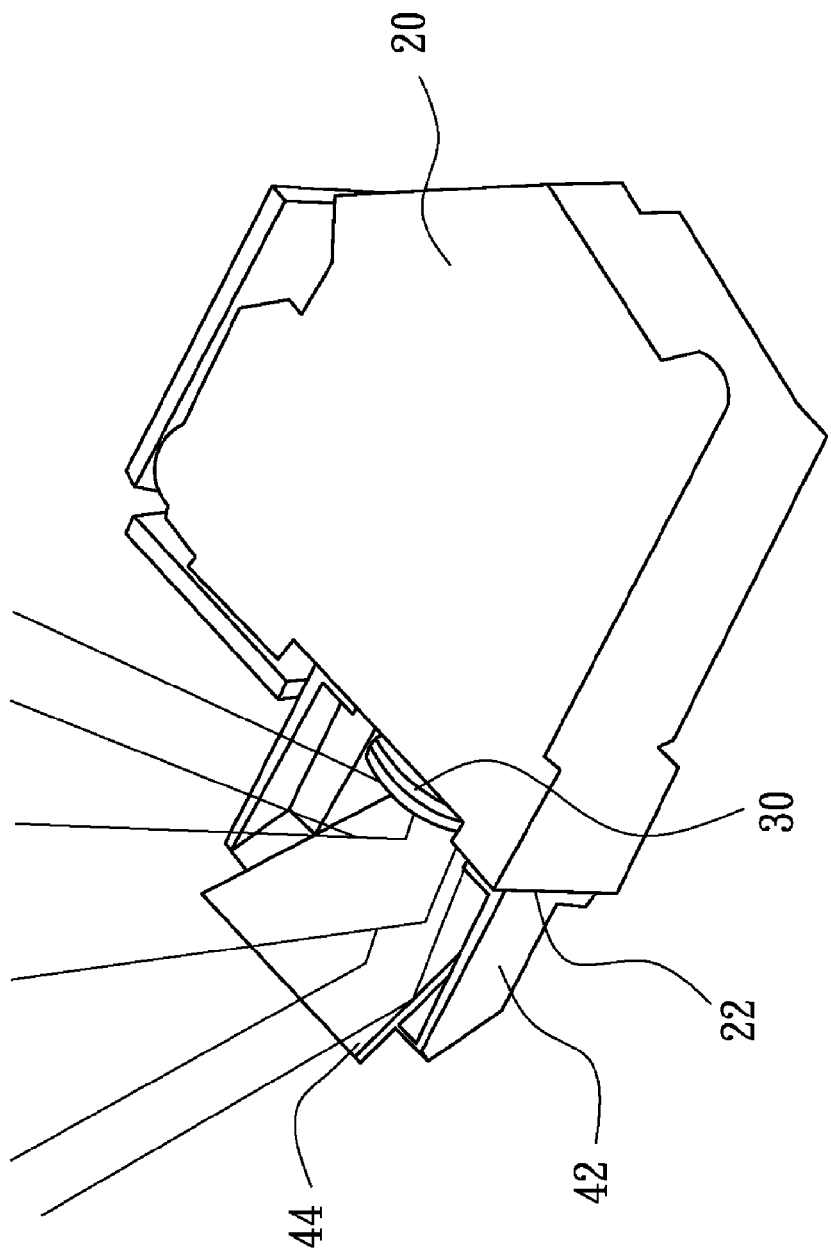
FIG. 8 is a perspective view of another embodiment of a projection device of the invention.

FIG. 8 depicts another embodiment of a projection device of the invention. In this embodiment, the cover body 42 is detachably mounted on the lateral side 22 of the housing 20. The mirror 44 is mounted on the cover body 42. When the cover body 42 is not mounted, light passes through the lens 30 to be projected to an object, such as a screen. When the cover body 42 is mounted in front of the lens 30, light passes through the lens 30 and is reflected by the mirror 44 to travel approximately at an angle of 90° with respect to the optical axis of the lens 30.

The projection device of the invention uses mirror 44 to change light direction. The housing bearing the light engine and the lens does not need to be divided into two parts, which causes a simple structure, high reliability and low cost.

What is claimed is:

1. A projection device, comprising:
   a housing;
   a light engine disposed in the housing to emit light;
   a lens disposed on a lateral side of the housing, for the light to pass therethrough; and
   a light direction regulating mechanism disposed on the lateral side and in front of the lens, to determine propagation of the light in a selected direction after the light passes through the lens;
   wherein the light direction regulating mechanism comprises a cover body and the cover body is rotatable.

2. The projection device as claimed in claim 1, wherein the light direction regulating mechanism further comprises a movable mirror, and the light passing through the lens is reflected by the mirror when the mirror is moved to be in front of the lens.

3. The projection device as claimed in claim 2, wherein an angle is formed between a normal line of the mirror and the selected direction.

4. The projection device as claimed in claim 2, wherein the cover body comprises a first opening, and the mirror is disposed in the cover body.

5. The projection device as claimed in claim 2, wherein the light direction regulating mechanism further comprises a cover body detachably mounted on the lateral side of the housing and in front of the lens, the mirror is disposed in the cover body, and the mirror is disposed in front of the lens to reflect the light passing through the lens when the cover body is mounted on the lateral side of the housing.

6. The projection device as claimed in claim 3, wherein the angle is substantially 45°.

7. The projection device as claimed in claim 4, wherein the cover body further comprises a partition wall dividing the interior space of the cover body into a first space and a second space.

8. The projection device as claimed in claim 4, wherein the cover body is disposed on the lateral side and slidable between a first position and a second position, the light passing through the lens exits from the first opening when the cover body is in the first position, and the mirror is disposed in front of the lens to reflect the light passing through the lens when the cover body is in the second position.

9. The projection device as claimed in claim 4, wherein the cover body is disposed on the lateral side of the housing and rotatable between a third position and a fourth position, the light passing through the lens exits from the first opening when the cover body is rotated to the third position, and the mirror is disposed in front of the lens to reflect the light passing through the lens when the cover body is rotated to the fourth position.

10. The projection device as claimed in claim 4, wherein the mirror is slidably disposed in the cover body, and the light passing through the lens is reflected by the mirror when the mirror slides to be in front of the lens.

11. The projection device as claimed in claim 7, wherein the first opening corresponds to the first space, and the mirror is disposed in the second space.

12. The projection device as claimed in claim 11, wherein the cover body further comprises a front wall on which the first opening is formed.

13. The projection device as claimed in claim 8, wherein the light direction regulating mechanism further comprises a front cover disposed on the cover body to selectively cover or expose the first opening, and the light passing through the lens exits from the first opening when the first opening is exposed.

14. The projection device as claimed in claim 9, wherein the cover body is rotatably disposed on the housing through a shaft.

15. The projection device as claimed in claim 9, wherein the light direction regulating mechanism further comprises a front cover disposed on the cover body to selectively cover or expose the first opening, and the light passing through the lens exits from the first opening when the first opening is exposed.

16. The projection device as claimed in claim 10, wherein the cover body further comprises a front wall on which the first opening is formed, a lateral wall and a second opening formed on the lateral wall, when the mirror slides to be in front of the lens, the light reflected by the mirror passes through the second opening.

17. The projection device as claimed in claim 16, wherein the lateral wall is adjacent to the front wall.

18. The projection device as claimed in claim 16, wherein the cover body further comprises a first front cover configured to cover the first opening and a second front cover configured to cover the second opening.

19. A projection device, comprising:

a housing;

a light engine disposed in the housing to emit light;

a lens disposed on a lateral side of the housing, for the light to pass therethrough; and a light direction regulating mechanism disposed on the lateral side and in front of the lens, to determine propagation of the light in a selected direction after the light passes through the lens;

wherein the light direction regulating mechanism comprises a cover body and the cover body is a hollow cuboid.

\* \* \* \* \*